US008130490B2

(12) United States Patent
Jiang et al.

(10) Patent No.: US 8,130,490 B2
(45) Date of Patent: Mar. 6, 2012

(54) DETACHABLE HARD DRIVE WITH AN ELECTROMAGNETIC SWITCH

(75) Inventors: Shun-Quan Jiang, Taipei Hsien (TW); Tzu-Yi Huang, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 83 days.

(21) Appl. No.: 11/987,119

(22) Filed: Nov. 27, 2007

(65) Prior Publication Data

US 2011/0273837 A1    Nov. 10, 2011

(30) Foreign Application Priority Data

Aug. 6, 2007    (TW) .................................. 96212885

(51) Int. Cl.
*G06F 1/16* (2006.01)
*H05K 5/00* (2006.01)
*H05K 7/00* (2006.01)

(52) U.S. Cl. .......... 361/679.33; 361/679.38; 361/679.39
(58) Field of Classification Search . 361/679.33–679.39
See application file for complete search history.

(56) References Cited

U.S. PATENT DOCUMENTS

| 4,301,494 A * | 11/1981 | Jordan ........................... 361/798 |
| 5,797,667 A * | 8/1998 | Wu .............................. 312/332.1 |
| 5,959,834 A * | 9/1999 | Chang ....................... 361/679.31 |
| 6,008,992 A * | 12/1999 | Kawakami .................... 361/726 |
| 6,252,514 B1 * | 6/2001 | Nolan et al. ................ 340/686.4 |
| 6,266,248 B1 * | 7/2001 | Hanas et al. ................... 361/752 |
| 6,302,714 B1 * | 10/2001 | Bolognia et al. .............. 439/157 |
| 6,373,713 B1 * | 4/2002 | Jensen et al. ................... 361/759 |
| 6,567,274 B1 * | 5/2003 | Tusan et al. .................... 361/740 |
| 6,774,808 B1 * | 8/2004 | Hibbs et al. ................. 340/686.4 |
| 6,952,341 B2 * | 10/2005 | Hidaka et al. ............ 361/679.32 |
| 6,952,342 B1 * | 10/2005 | Chen ......................... 361/679.38 |
| 7,035,096 B2 * | 4/2006 | Franz et al. .............. 361/679.32 |
| 7,239,522 B2 * | 7/2007 | Rust et al. ...................... 361/732 |
| 7,264,490 B1 * | 9/2007 | Reznikov ....................... 439/152 |
| 7,301,778 B1 * | 11/2007 | Fang .............................. 361/759 |
| 7,327,564 B2 * | 2/2008 | Carlson et al. ........... 361/679.33 |
| 7,455,539 B2 * | 11/2008 | Gunther et al. ............... 439/160 |
| 7,499,271 B2 * | 3/2009 | Wagatsuma et al. ..... 361/679.33 |
| 7,511,953 B2 * | 3/2009 | Tao et al. .................. 361/679.39 |
| 7,679,933 B2 * | 3/2010 | Makabe ......................... 361/801 |
| 2003/0002261 A1 * | 1/2003 | Berry et al. .................... 361/727 |
| 2004/0012921 A1 * | 1/2004 | Hidaka et al. ................. 361/685 |
| 2004/0264146 A1 * | 12/2004 | Kerrigan et al. .............. 361/726 |
| 2005/0122674 A1 * | 6/2005 | Szolyga et al. ............... 361/685 |
| 2005/0207108 A1 * | 9/2005 | Chen ............................. 361/685 |
| 2006/0041783 A1 * | 2/2006 | Rabinovitz ....................... 714/6 |
| 2007/0076366 A1 * | 4/2007 | Makabe ......................... 361/685 |
| 2007/0211422 A1 * | 9/2007 | Liu et al. ....................... 361/685 |

* cited by examiner

*Primary Examiner* — Jayprakash N Gandhi
*Assistant Examiner* — Adrian S Wilson

(57) ABSTRACT

A detachable hard drive with an electromagnetic switch comprises a tray, a fastening unit and an electromagnetic switch. The electromagnetic switch is powered on when the hard drive is in operation, and sequentially the fastening unit is electrically controlled by the electromagnetic switch to automatically fasten with the housing body of an electronic product. On the contrary, the electromagnetic switch is powered off when the hard drive stops the operation so as to the hard drive can be released from the electronic product. Thus, the invention relating to the detachable hard drive with an electromagnetic switch is to ensure the hard drive can be securely released from the electronic product when the electromagnetic switch is powered off for preventing the data erased and the firmware damaged.

8 Claims, 3 Drawing Sheets

DETACHABLE HARD DRIVE WITH AN ELECTROMAGNETIC SWITCH

BACKGROUND OF THE INVENTION

1. Field of the Invention

The present invention relates to an associative device connected to a detachable hard drive and a housing body of an electronic product, more particularly to an automatically fastening device coupled to the detachable hard drive and the housing body of the electronic product.

2. Description of Related Art

Nowadays, when powering on an electronic product, such as server, storage, mainframe, game console and so on, a detachable hard drive disposed inside the electronic product can be easily released from the electronic product. This interruption occurred while processing system program and saving data results in the data lost and firmware damaged.

There are some prior arts relating to a detachable hard drive with a fastening apparatus are disclosed. For example, the prior arts TW Patent M306458 and M306377 respectively disclose a detachable hard drive with different fastening units for preventing the hard drive being released; also, the TW M302726 discloses a handle latching unit and latching elements thereof associating with a tray of a detachable hard drive; further, the TW Patent 509366 discloses a detachable hard drive hanger with a fastening unit.

In general, one detachable hard drive in accordance with the prior arts is controlled by a handle and a key-locking unit. When the handle is fastened and the key-locking unit is locked, they enable the detachable hard drive to power on; whereas, when the key-locking unit is unlocked and the handle is unfastened, the detachable hard drive is powered off. The shortage of the aforementioned key-locking unit is that it still needs a key to unlock to release the detachable hard disk from an electronic product. Further, when the hard drive is in operation, the detachable hard drive still can be forcibly released from the electronic product by the key which results in the data lost and firmware damaged.

Moreover, the other detachable hard drive in accordance with the prior arts is controlled by a handle and a limit switch. When the handle is fastened and intrigued the limit switch to power on, the detachable hard drive is forced in operation; whereas, when the handle is unfastened and the limit switch will be off, it forces the detachable hard drive to power off. The shortage of such limit switch is that it still can release the detachable hard disk from an electronic product when the hard drive is in operation which also results in the data lost and firmware damaged.

SUMMARY OF THE INVENTION

It is therefore a primary object of the claimed invention relating to a detachable hard drive with an electromagnetic switch that when a hard drive is in operation, a fastening unit is electrically controlled by an electromagnetic switch to automatically fasten with the housing body of an electronic product.

Another object of the present invention relating to a detachable hard drive with an electromagnetic switch that it ensures a hard drive can be securely released when a hard drive stops the operation which prevents loss of the data and the damage of the firmware in the hard drive.

The present invention relating to a detachable hard drive with an electromagnetic switch comprises a tray for carrying a retractable hard drive, a fastening unit coupling with the tray is used to conduct interference with the housing body of an electronic product for firmly conjoining the tray and a housing body, and an electromagnetic switch coupling with the fastening unit, and electrically connecting to the hard drive, wherein the electromagnetic switch is powered on when the hard drive is in operation, and then the fastening unit is electrically controlled by the electromagnetic switch to automatically fasten with the housing body of the electronic product so that user couldn't directly take out the hard drive from the electronic product. Further, in order to prevent the hard drive randomly being released from the electronic product which results in the data and the firmware in the hard drive from being lost and damaged, the present invention is designed for securely taking out the hard drive when the hard drive stops the operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention can be more fully understood by reference to the following description and accompanying drawings, in which.

DETAILED DESCRIPTION OF THE INVENTION

Figure 1:
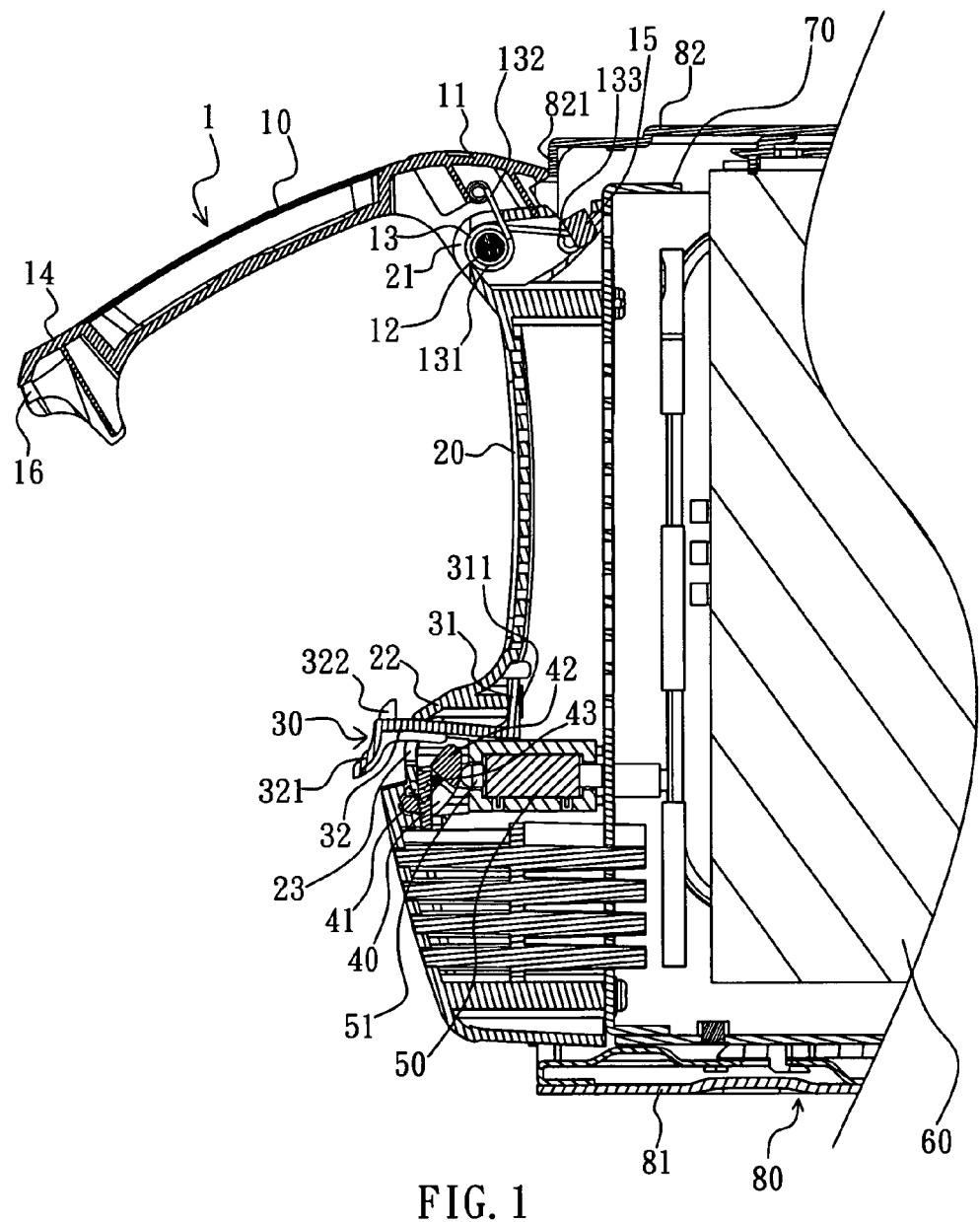
FIG. 1 is a side elevation in cross-sectional view of a handle in opening mode according to the present invention.

Referring to FIG. 1, which is a side elevation in cross-sectional view of a handle in opening mode according to the present invention. The present invention relating to a detachable hard drive with an electromagnetic switch comprises a tray 70 for retractably carrying a hard drive, a fastening unit 1 and an electromagnetic switch 50. The fastening unit 1 includes a handle 10, a housing body 20, a third interference element 30, and a fourth interference element 40. The first end 11 of the handle 10 has a first interference element 15 as a bump, and the second end 14 of the handle 10 has a second interference element 16 as a fastening aperture, wherein the first end 11 of the handle 10 is pivotally connected to a first end 21 of a housing body 20 by a pivot 12. The fastening unit 1 further includes a first resilient element 13 as a torsion-type helical spring, wherein a central-hole 131 of the first resilient element 13 is used to cover around the pivot 12, and the two ends 132 and 133 of the first resilient element 13 respectively couples to the first end 11 of the handle 10 and the first end 21 of the housing body 20. Sequentially, the handle 10 is open by means of the resilience from the first resilient element 13 that forces an opening angle between the second end 14 of the handle 10 and the second end 22 of the housing body 20.

Moreover, the first end 31 of the third interference element 30 is fastened inside the housing body 20 by a screw 311, and the second end 32 is extended to the exterior side of the housing body 20 through a through-hole 23 on the housing body 20. Also, the second end 32 of the third interference element 30 is attached with the housing body 20 and is resiliently moveable when necessary. The second end 32 of the third interference element 30 has a pressing surface 321 and a fifth interference element 322 as a tenon, wherein the fifth interference element 322 conducts interference with the second interference element 16. For example, the tenon is buckled up into a fastening aperture which forces the handle 10 is closed when the second end 14 of the handle 10 is attached to the second end 22 of the housing body 20. In addition, by pressing the pressing surface 321 of the third interference element 30, it results in moving the second end 32 of the third interference element 30, whereby the fifth interference element 322 can be moved toward to the second interference element 16 so that the second end 14 of the handle 10 can not be restrictedly interfered with the third interference element 30.

Further, the fourth interference element 40 has a pivot 41 disposed at two side of one end, and has a stopper 42 disposed at the other end. The pivot 41 is pivotally connected to the housing body 20. Also, the stopper 42 can be forcibly baffled third interference element 30 moving toward the position of the second interference element 16 as referring to the FIG. 3.

In addition, a second resilient element 43 as a torsion-type helical spring which is used to conduct interference with the fourth interference element 40 so as to prevent the stopper 42 moving toward the second end 32 of the third interference element 30. An electromagnetic switch 50 is electrically connected to hard drive 60 and it is powered on when the hard drive is in operation; whereas, the electromagnetic switch is powered off when the hard drive stops the operation. The electromagnetic switch 50 having a movable rod 51 can be activated and extended when the electromagnetic switch is powered on. Once the movable rod 51 is activated, its ending portion forces the stopper 42 of the fourth interference element 40 to move toward the third interference element 30, which results in the fact that the stopper 42 of the fourth interference element 40 is forced to baffle the second end of the third interference element 30, and further the fifth interference element 322 can not move toward the detached second interference element 16 referring to the FIG. 3.

On the other hand, the front end of the tray 70 is coupled to the housing body 20. The tray 70 is disposed in between a chassis 81 and an upper cover 82 of an electronic product 80. The upper cover 82 has a sixth interference element 821 corresponding to the first interference element 15. For example, when the handle 10 is closed, the first interference element 15 conducts interference with the sixth interference element 821 as an ear-shape slice which is downwardly bent. With the description in the aforementioned example as shown in the FIG. 2, it's further understood that the first interference element 15 is disposed at inside the sixth interference element 821 therein, whereby the handle 10 is forcibly baffled, and the hard drive 60 could not be smoothly released from the electronic product 80.

Figure 2:
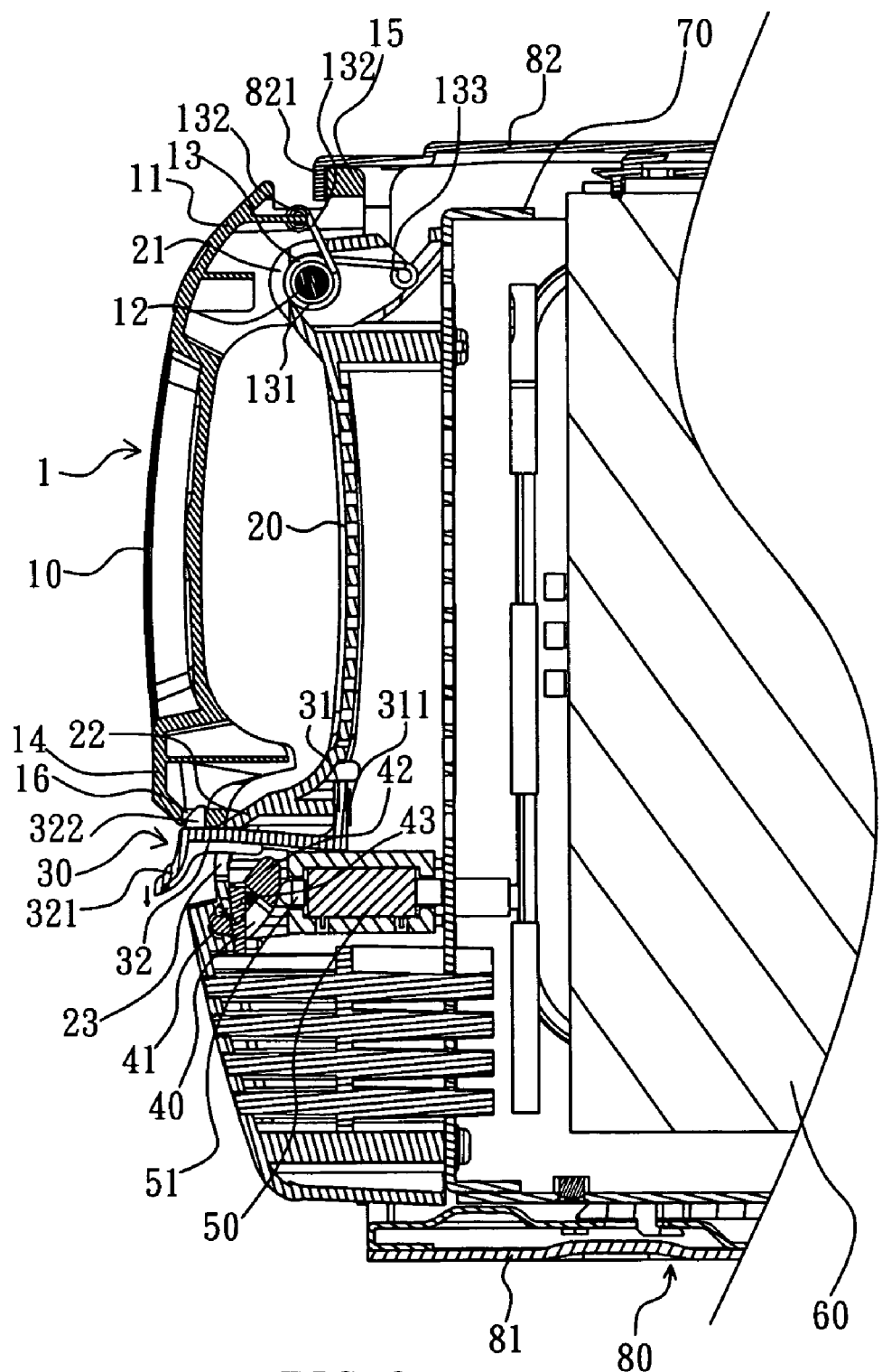
FIG. 2 is a side elevation in cross-sectional view of a handle in closing mode according to the present invention.

Referring to FIG. 2, which is a side elevation in cross-sectional view of a handle in closing mode according to the present invention. When the tray 70 is disposed in between the chassis 81 and the upper cover 82 of the housing body of the electronic product 80, the handle 10 will further be closed. It can ensure that the hard drive 60 is securely disposed in the housing body 20 of the electronic product 80 therein when the first interference element 15 conducts interference with the sixth interference element 821, and the second interference element 16 conducts interference with the third interference element 30. At that time, the third interference element 30 has not conduct interference with the fourth interference element 40 yet. Therefore, user still can press the pressing surface 321 of the third interference element 30 so that the fifth interference element 322 can be released from the position of the second interference element 16. Sequentially, forcing the handle forming in opening mode by the resilience force of the first resilient element 13 referring to FIG. 1; finally, the hard drive can be smoothly taken out from the electronic product 80.

Figure 3:
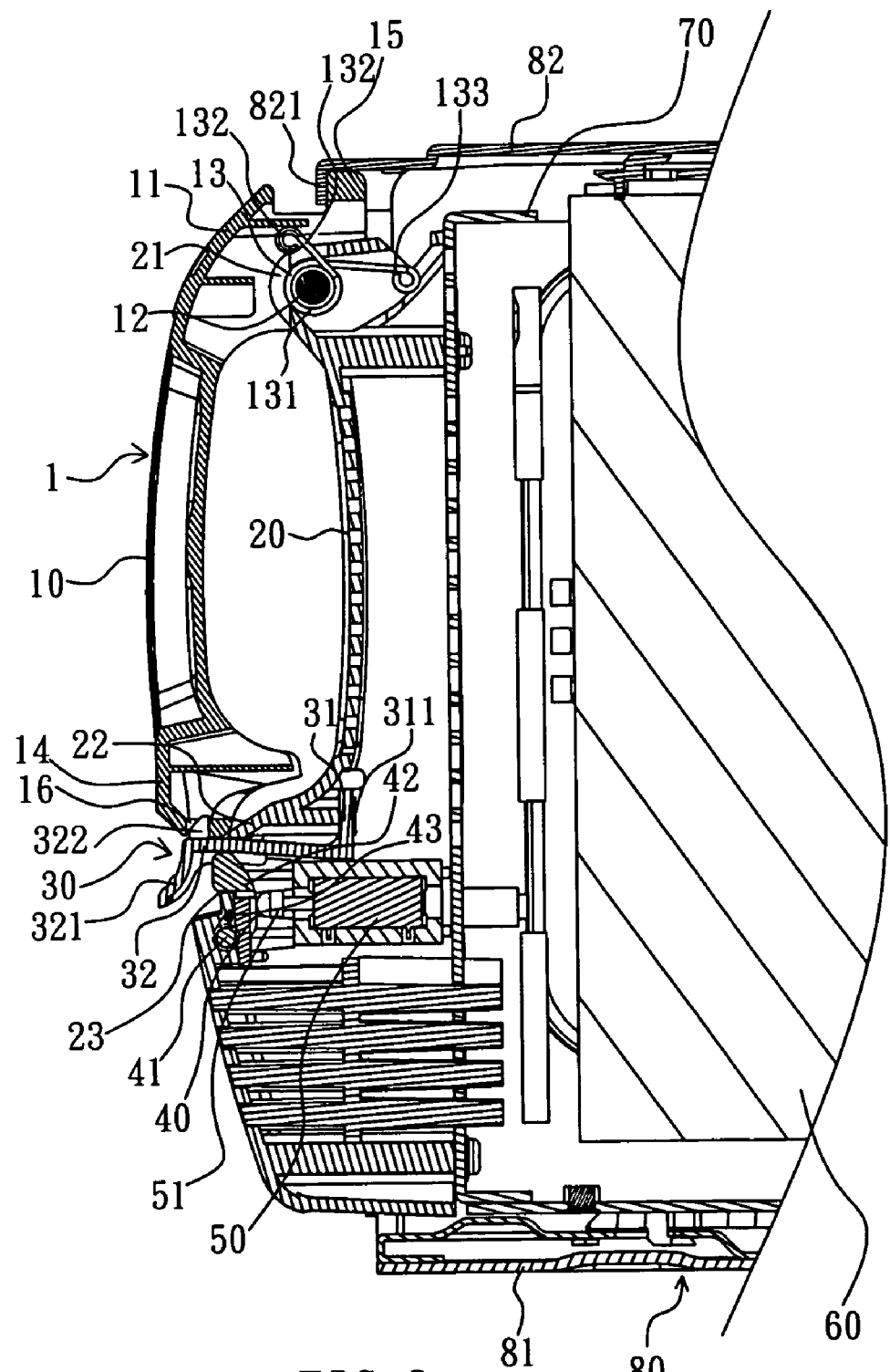
FIG. 3 is a side elevation in cross-sectional view of a handle in fastening mode according to the present invention.

Referring to FIG. 3, which is a side elevation in cross-sectional view of a handle in fastening mode according to the present invention. When the hard drive 60 electrically conducts with the electronic product 80, the electromagnetic switch 50 is powered on and activated by means of electrically connecting to the hard drive 60. At this time, the movable rod 51 is activated and extended to push the stopper 42 connected to the fourth interference element 40 for baffling the third interference element 30 so that the third interference element 30 can not be released to interfere with the second interference element 16. When user press the pressing surface 321 of the third interference element 30, the handle 10 can not be opened and then the hard drive 60 can not be taken out from the electronic product 80 due to the fact that the second end 32 of the third interference element 30 is forcibly baffled by the stopper 42 which results in the second interference element 16 can not be conducted interference with the third interference element 30 as shown in the FIG. 2. When the hard drive 60 stops operation resulting in the electromagnetic switch 50 is powered off, the movable rod 51 can not be extended to baffle the stopper 42. With applying the resilience of the second resilient element 43, the stopper 42 can not be moved toward the second end 32 of the third interference element 30. When user presses the pressing surface 321 of the third interference element 30, the handle 10 can be opened and then the hard drive can be taken out from the electronic product 80 due to the fact that the second end 32 of the third interference element 30 is not forcibly baffled by the stopper 42 which results in the second interference element 16 can not be conducted interference with the third interference element 30 as shown in the FIG. 2.

When the hard drive 60 is in operation, the handle 10 is fastened by means of activating the electromagnetic switch 50 and the fourth interference element 40. At this time, the handle 10 can not be opened when user presses the pressing surface 321 of the third interference element 30 to release the hard drive 60 from the electronic product 80. However, it can ensure that the hard drive 60 can not be released from the electronic product 80 when the hard drive 60 is in operation which prevents the data lost and firmware damaged.

Therefore, the present invention relates to a detachable hard drive with an electromagnetic switch, wherein the electromagnetic switch is powered on when the hard drive is in operation. Sequentially, the fastening unit is electrically controlled by the electromagnetic switch to automatically fasten the hard drive with the housing body of an electronic product. On the contrary, the electromagnetic switch is powered off when the hard drive stops the operation so as to the hard drive can be released from the electronic product. Thus, the present invention relating to the detachable hard drive with an electromagnetic switch is to ensure the hard drive can be securely released when the electromagnetic switch is powered off for preventing the data erased and the firmware damaged.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detachable hard drive with an electromagnetic switch comprising:

a tray for carrying a hard drive;

a fastening unit coupling with the tray for conducting interference with a housing body of an electronic product for firmly conjoining the tray and the housing body; and an electromagnetic switch coupling to the fastening unit, and electrically connecting to the hard drive;

wherein the electromagnetic switch is powered on when the hard drive is in operation, and then the fastening unit is electrically controlled by the electromagnetic switch so as to automatically fasten a handle of the fastening unit;

wherein the fastening unit further comprises:

a handle including a first end with a first interference element, and a second end with a second interference element wherein the first interference element is used to conduct interference with an interference element corresponding to the housing body of the electronic product;

a housing body having a first end and a second end with the first end of the housing body pivotally connecting to the first end of the handle;

a third interference element having a first end and a second end, the first end of the third interference element connecting to the housing body, and the second end extending to the exterior side of the housing body and conducting interference with the second interference element;

a fourth interference element connecting to the housing body at one side, and having a stopper at the other side;

wherein the electromagnetic switch further has a movable rod; when the electromagnetic switch is powered on, the movable rod forces the stopper to prevent the second end of the third interference element being released from interference with the second interference element.

2. The detachable hard drive with an electromagnetic switch of claim 1, wherein the second end of the housing body has a through-hole;

the first end of the third interference element firmly connects to the inside of the housing body, and the second end extending to the exterior side of the housing body through the through-hole;

the fourth interference element pivotally connects to the housing body at said one side.

3. The detachable hard drive with an electromagnetic switch of claim 1 further comprises a first resilient element which forces an opening angle between the second end of the handle and the second end of the housing body.

4. The detachable hard drive with an electromagnetic switch of claim 3, wherein the second end of the third interference element has a pressing surface and a fifth interference element, and the fifth interference element is used to conduct interference with the second interference element; the pressing surface is pressed so as the fifth interference element can be released from the second interference element.

5. The detachable hard drive with an electromagnetic switch of claim 4, further comprises a second resilient element which is used to conduct interference with the fourth interference element so as to prevent the stopper moving toward the second end of the third interference element.

6. The detachable hard drive with an electromagnetic switch of claim 5, wherein the second interference element and the fifth interference element respectively means a corresponding fastening aperture and a tenon.

7. The detachable hard drive with an electromagnetic switch of claim 6, wherein the first interference element is a bump.

8. The detachable hard drive with an electromagnetic switch of claim 7, wherein the housing body of the electronic product has a sixth interference element which is used to conduct interference with the corresponding first interference element.

* * * * *